United States Patent [19]

Grant

[11] Patent Number: 5,176,187

[45] Date of Patent: Jan. 5, 1993

[54] FLEXIBLE GAS SALVAGE CONTAINERS AND PROCESS FOR USE

[75] Inventor: David C. H. Grant, Selbyville, Del.

[73] Assignee: Ashland Oil, Inc., Ashland, Ky.

[21] Appl. No.: 601,838

[22] Filed: Oct. 18, 1990

Related U.S. Application Data

[63] Continuation-in-part of Ser. No. 394,594, Aug. 16, 1989, Pat. No. 5,058,631, and a continuation-in-part of Ser. No. 371,785, Jun. 27, 1989, Pat. No. 4,969,495.

[51] Int. Cl.$^5$ .......................................... F25B 45/00
[52] U.S. Cl. .......................................... 141/10; 141/7; 141/65; 141/114; 141/313; 141/85; 141/98; 62/77; 62/149; 62/174
[58] Field of Search .................... 141/8, 7, 10, 65, 82, 141/85, 98, 114, 313–317, 329, 330; 62/77, 149, 174, 292, 324.4, 474, 475; 383/10, 17, 89, 109, 111, 113, 116, 43, 71, 904, 906; 137/205; 206/524.8; 150/154

[56] References Cited

U.S. PATENT DOCUMENTS

| | | | |
|---|---|---|---|
| 2,522,969 | 9/1950 | Smith | 141/65 |
| 2,966,043 | 12/1960 | Ross | 62/174 |
| 3,232,070 | 2/1966 | Sparano | 62/149 |
| 3,487,656 | 1/1970 | Grant | 62/174 |
| 3,643,460 | 2/1972 | Garland | 62/174 |
| 3,699,781 | 10/1972 | Taylor | 62/474 |
| 3,729,949 | 5/1973 | Talbot | 62/149 |
| 3,795,262 | 3/1974 | Post | 62/77 |
| 3,837,173 | 9/1974 | Kuttruff | 62/128 |
| 3,892,058 | 7/1975 | Komatsu | 53/21 FC |
| 3,939,669 | 2/1976 | Schumacher | 62/217 |
| 4,106,306 | 8/1978 | Saunders | 62/149 |
| 4,172,477 | 10/1979 | Reich | 141/8 |
| 4,245,480 | 1/1981 | Saunders | 62/149 |
| 4,261,178 | 4/1981 | Cain | 62/149 |
| 4,266,405 | 5/1981 | Trask | 62/160 |
| 4,285,206 | 8/1981 | Koser | 62/292 X |
| 4,363,222 | 12/1982 | Cain | 62/292 |
| 4,364,236 | 12/1982 | Lower | 62/77 |
| 4,401,447 | 8/1983 | Huber | 55/387 |
| 4,441,330 | 4/1984 | Lower | 62/149 |
| 4,463,575 | 8/1984 | McCord | 62/184 |

(List continued on next page.)

FOREIGN PATENT DOCUMENTS

| | | | |
|---|---|---|---|
| 6146083 | 11/1981 | Japan | 141/8 |
| 8100756 | 3/1981 | PCT Int'l Appl. | 62/77 |
| 0947941 | 1/1964 | United Kingdom | 141/8 |

OTHER PUBLICATIONS

Distriparts Service Instruction, Distriparts Sweden AB Feb. 7, 1989, Entire Document.

Robert Basch Hausgerate GmbH *(Zkd 51.4161.6902.00, Linde AG Publications (*English translation).

Pollution Measurement Corp., Oak Park, Ill., (undated-)–"Gas Sampling Bags".

"Plan to Release CFC Coolants Produces Heat"–Wall Street Journal Sep. 6, 1989.

Perimeter Concept for Solvent Emission Control, by (List continued on next page.)

Primary Examiner—Henry J. Recla
Assistant Examiner—Casey Jacyna
Attorney, Agent, or Firm—Richard C. Willson, Jr.; Stanley M. Welsh

[57] ABSTRACT

A process and apparatus for evacuating refrigerant for recovery from a conventional refrigeration sytems, e.g. automobile air conditions, preferably by attachment to a manifold having multiple evacuation devices, e.g. compressor, vacuum pump, transfer pump with the evacuation devices discharging through self-closing quick connect valves into at least one flexible accumulator, e.g. a bag mounted onto a manifold, and with an additional transfer pump evacuating the bag gradually to a recovery system which can be a conventional refrigerant recovery condensing unit with purification. Facilities for receiving bags filled from refrigeration systems which are remote from the system, e.g. home refrigerators, can be provided to weigh the contents into the manifold for recovery.

6 Claims, 9 Drawing Sheets

U.S. PATENT DOCUMENTS

| | | | |
|---|---|---|---|
| 4,474,034 | 10/1984 | Avery | 62/503 |
| 4,476,688 | 10/1984 | Goddard | 62/149 |
| 4,480,446 | 11/1984 | Margulefsky | 62/474 |
| 4,513,578 | 4/1985 | Proctor | 62/149 |
| 4,528,826 | 7/1985 | Avery | 62/503 |
| 4,539,817 | 9/1985 | Staggs | 62/149 |
| 4,554,792 | 11/1985 | Margulefsky | 62/77 |
| 4,601,177 | 7/1986 | Tanino | 62/149 |
| 4,611,473 | 9/1986 | Wada | 62/503 |
| 4,624,112 | 11/1986 | Proctor | 62/149 |
| 4,646,527 | 3/1987 | Taylor | 62/85 |
| 4,688,388 | 8/1987 | Lower | 62/126 |
| 4,714,487 | 12/1987 | Rowles | 62/24 |
| 4,730,465 | 3/1988 | Inoue | 62/503 |
| 4,766,733 | 8/1988 | Scuderi | 62/77 |
| 4,768,347 | 9/1988 | Manz | 62/149 |
| 4,776,174 | 10/1988 | Rich | 62/77 |
| 4,788,833 | 12/1988 | Steele | 62/474 |
| 4,805,416 | 2/1989 | Manz | 62/292 |
| 4,809,515 | 3/1989 | Houwink | 62/149 |
| 4,809,520 | 3/1989 | Manz | 62/292 |
| 4,856,289 | 8/1989 | Lofland | 62/149 |
| 4,862,699 | 9/1989 | Lounis | 62/84 |
| 4,878,356 | 11/1989 | Punches | 62/149 |
| 4,878,931 | 11/1989 | Grant | 62/17 |
| 4,887,435 | 12/1989 | Anderson | 62/85 |
| 4,903,499 | 2/1990 | Merritt | 62/149 |
| 4,909,042 | 3/1990 | Proctor | 62/149 |
| 4,942,741 | 7/1990 | Hancock | 62/292 |
| 4,967,567 | 11/1990 | Proctor | 62/127 |
| 4,996,848 | 3/1991 | Nelson et al. | 62/77 |

OTHER PUBLICATIONS

David C. H. Grant presented at Int'l Conf. on CFC and Halon Alternatives 10–11 Oct. '89 per phone call.

RSC Magazine, Mar. 1990, "Whirlpool System Uses Plastic Bag to Recover Refrigerants".

FLEXIBLE GAS SALVAGE CONTAINERS AND PROCESS FOR USE

CROSS REFERENCE TO RELATED APPLICATION

This application is a continuation-in-part of U.S. Ser. No. 394,594 filed Aug. 16, 1989 now U.S. Pat. No. 5,058,631 and a continuation-in-part of U.S. Ser. No. 371,785 filed Jun. 27, 1989 now U.S. Pat. No. 4,969,495.

U.S. Ser. No. 07/371,785 filed Jun. 27, 1989 relates to the general field of recovery of refrigerants and names the same inventor as the present application and employs slack-sided accumulators which can be similar to the bags used in the present invention.

BACKGROUND OF INVENTION

The loss of refrigerant such as R-12 refrigerant from refrigeration systems, particularly during servicing of automotive air conditioning systems is the subject of much public concern at this time. A refrigeration service mechanic in servicing the air conditioning system normally vents the same. During venting, a significant amount of R-12 vapor is lost from the air conditioning system. There is a need, therefore, to provide a practical, simple, effective and low cost refrigerant recovery and restoration system which will allow the mechanic to vent an automotive air conditioning system with full recovery of the vapor contained therein, to provide a system which at least in part is relatively transportable to the situs of the automotive or like air conditioning or refrigeration system, which produces reclaimed refrigerant of equal quality in comparison to virgin refrigerant which is mall in size, but which will be capable of operating with the volume of normal automotive air conditioning service operation.

Attempts have been made to produce an effective refrigerant recovery and/or disposal, purification and recharging system. Issued U.S. Patents representative of such known systems are: U.S. Pat. Nos. 3,232,070; 4,285,206; 4,363,222; 4,441,330; 4,476,688; 4,539,817; 4,554,792; 4,646,527; and 4,766,733.

These patents disclose as aspects of such refrigerant recovery systems the employment of components such as vacuum pumps, oil separators, condensers, liquid refrigerant receivers and accumulators. Unfortunately, the systems identified above are characterized by complexity and high pressure operation and are plagued with maintenance problems due particularly to the high pressure portions of the system.

It is therefore an object of the present invention to provide an improved, low cost, simple, essentially atmospheric pressure operated refrigerant recovery and restoration system which operates primarily as a direct condensation process, which has particular application to servicing automotive air conditioning systems, but is not limited thereto, and which may be advantageously employed in servicing home refrigerators or systems using R-12 as refrigerant, and which obviates the problems discussed above with respect to the known prior art.

All of the prior attempts to recover refrigerant have suffered from the difficulty that they require extensive apparatus to be brought to the site where the refrigerant is to be salvaged, or that the refrigeration unit being serviced has to be brought to a central reclaiming system. The present invention, by its use of approximately atmospheric pressure, bags which may be either reusable or even disposable, permits a refrigeration service engineer to fill a number of the bags at various locations where refrigerant is to be salvaged and, for example, at the end of his working day, return these bags to a central refrigeration recovery system where the refrigerant may be condensed and purified for reuse.

Another method which was used in the past for recovering refrigerant was to fill small pressure vessels with the refrigerant by compressing the refrigerant into the pressure vessels through the action of the compressor on the refrigeration unit from which the refrigerant is being withdrawn or by action of a liquid pump or a vacuum pump. As anyone connected with liquified compresses gas handling knows, over-filling of any pressure vessel is always of concern. Pressure relief devices are not always reliable and may fail to open after years of hard handling in and out of trucks, contamination by grease and oil, corrosion, etc. Therefore, the possibility of hydrostatic rupture and even explosion is always present when a pressure vessel is being filled. This danger is greatly extenuated when the filling is being done in the field under adverse circumstances and generally without any weighing device, often by only modestly experienced personnel.

It is an object of the present invention to provide a safe, low cost, simple, essentially atmospheric pressure refrigerant recovery system which avoids the need for bringing expensive, bulky equipment to the location from which the refrigerant is to be salvaged. Another object is to provide a reclaiming system which is light and small which can be brought to the salvage site. Still another object is to avoid having a mechanical reclaiming system for each service mechanic or for small companies which may not be able to justify the purchase of reclaiming systems. Still another object is to avoid the difficulty of smaller reclaiming systems which may take too long to recover the refrigerant vapor which is being salvaged. A further object is to provide a simple, easy to use, lightweight system to capture refrigerant vapor at the service site; to allow reclaiming at a later time without delaying the service work; and to allow a central reclaiming unit to reclaim refrigerant form a multiplicity of service men each servicing a multiplicity of refrigeration units. Another object is to avoid loss of CFC vapor to the atmosphere by making practical reclaiming of vapor from scrapped or disabled refrigerators automobile and other refrigeration systems or those requiring servicing.

The present invention provides economic, convenience, and safety advantages over the solutions taught in the prior art because the bags used by the present invention are cheap and disposable or reusable, the bags take up virtually no space prior to their being filled, and the bags, if somehow overfilled, will merely rupture softly by tearing apart at the weld or elsewhere, without any danger of explosion due to high pressure rupture such as would be involved in the failure of a pressure vessel.

SUMMARY OF THE INVENTION

The present invention utilizes slack-sided bags (bladders or balloons) to contain refrigerant vapor from refrigeration units from which the refrigerant is to be salvaged, e.g. refrigerators which need compressor replacements, commercial cold display case units, household and commercial heat pumps, automotive air conditioners, and any other system which utilizes-halogenated hydrocarbons or other liquifiable gases as refrigerants in connection with a compressor, condenser, and evaporator.

The present invention embodies the recognition that bags of a practical size can contain refrigerant vapor from automobiles, home refrigerators, supermarket display cases, etc. at substantially atmospheric pressure. For example, a typical household refrigerator contains 0.5 pounds of refrigerant which is equivalent to approximately 1.6 cubic foot at atmospheric pressure and 90° F. The refrigerant vapor capture apparatus is shown.

DESCRIPTION OF THE PREFERRED EMBODIMENTS

Figure 1:
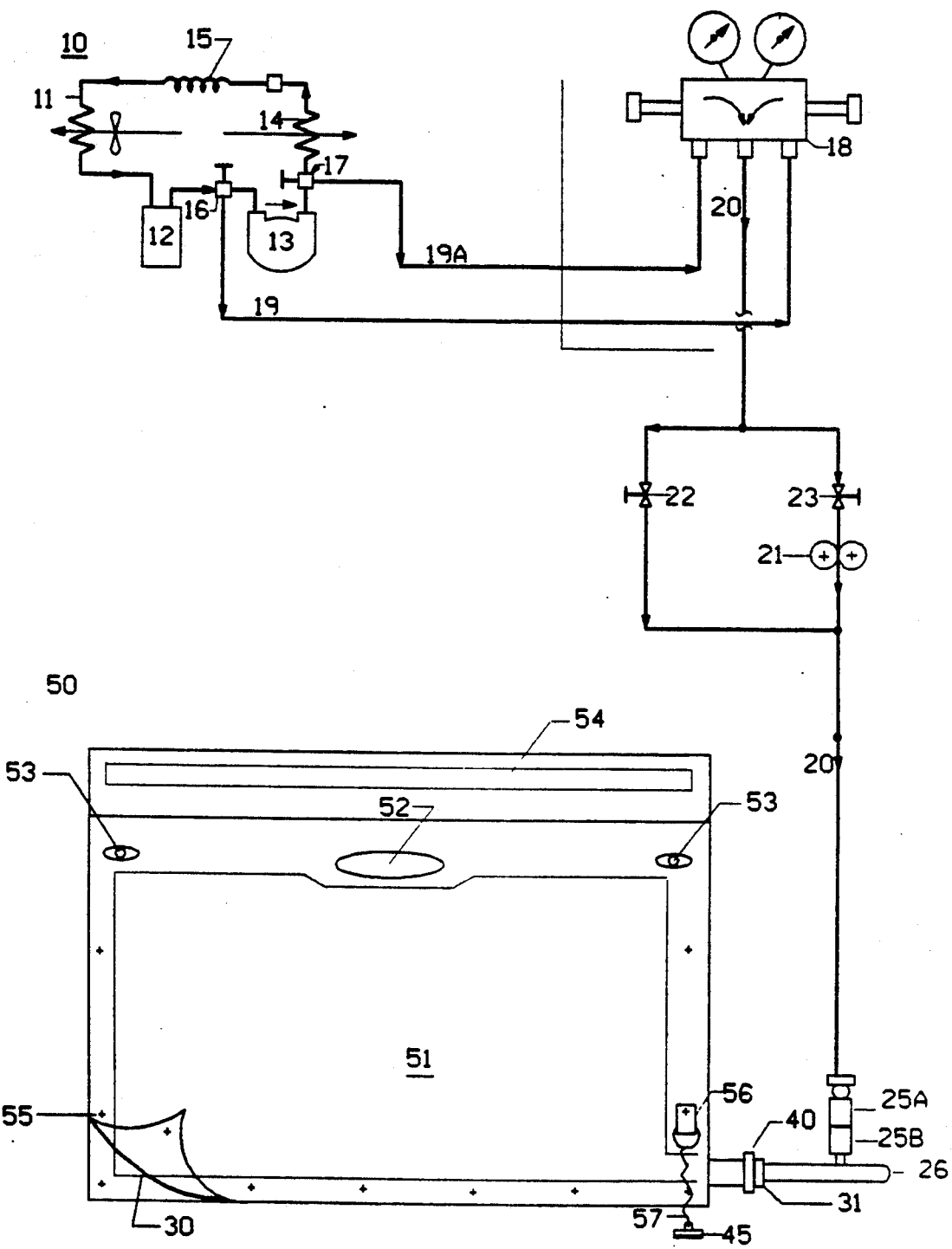
FIG. 1 is a schematic diagram of the overall system of the present invention showing the refrigeration system from which refrigerant is to be salvaged, the bag, and the refrigerant vapor capture system.

Referring to FIG. 1, 10 is a typical home refrigeration system showing the evaporator 11, the accumulator 12, the compressor 13, the condenser 14, and the capillary 15.

Figure 2:
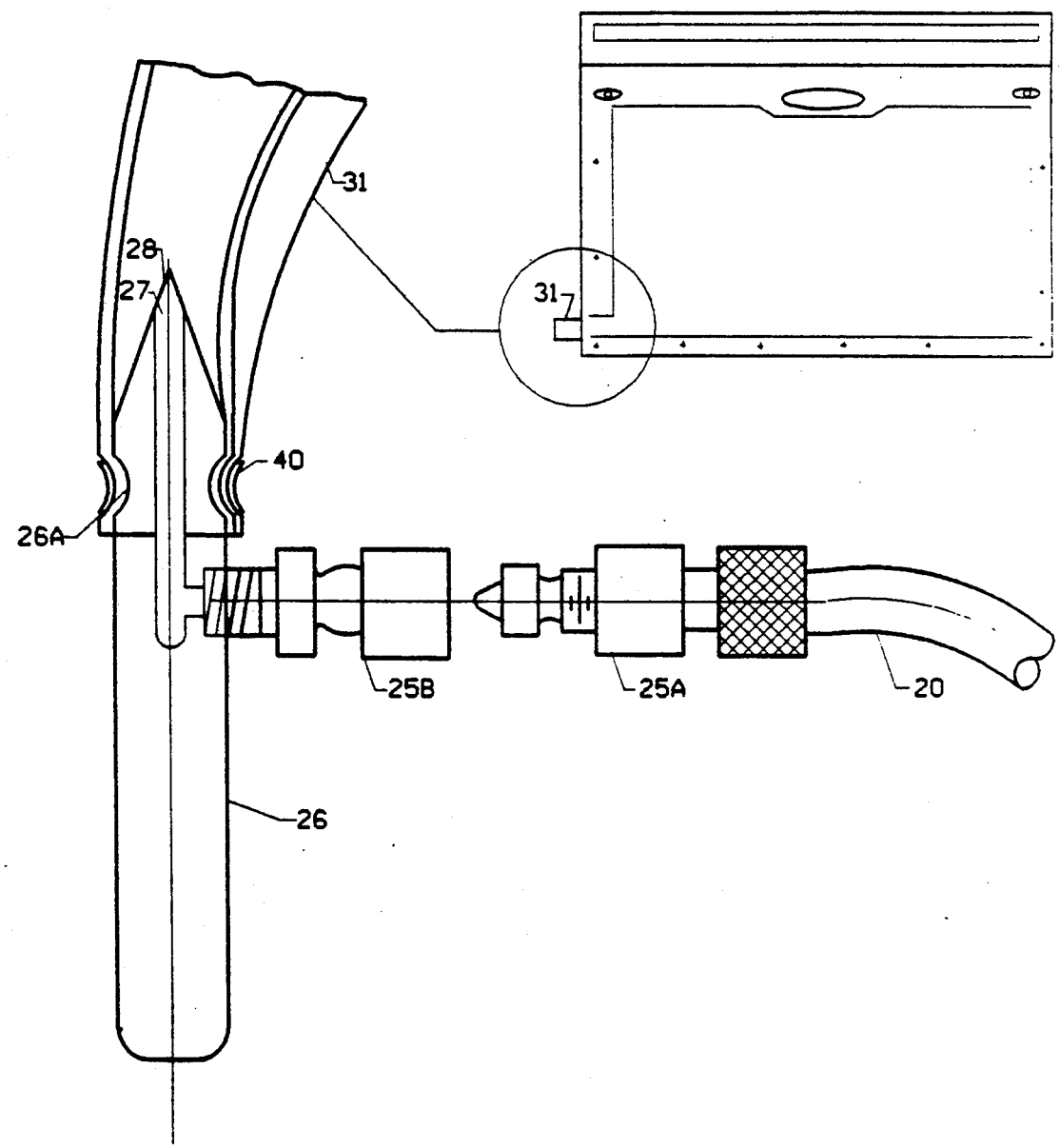
FIG. 2 is a schematic diagram of an improved means to attach the bag to the refrigeration system for the purpose of transferring the refrigerant vapor from the refrigeration system being serviced to the bag using a convenient handle and commercially available double shut off quick disconnect coupling to connect to the conventional serviceman's refrigeration gauge set and connecting hose.

A conventional piercing valve 16 is placed on the low pressure side of the compressor and a conventional piercing valve 17 is placed on the high pressure discharge of the compressor. Hoses 19 and 19a lead respectively from piercing valves 16 and 17 to conventional refrigeration service gauge set 18 which consists of a manifold with high and low pressure gauges connecting to hoses 19 and 19A. A third hose 20 leads from the gauge set to inlet valve 25. This connection between gauge set 18 and inlet valve 25 can optionally (not necessarily) be through a vacuum pump 21 with appropriate valves 22 and 23 to evacuate the refrigeration system. This vacuum pump would be particularly useful in salvaging refrigerant from an automobile air conditioner. Valve 25 is shown in detail in FIG. 2 and consists of a commercial double shut off quick disconnect coupling, male part 25a and female part 25b, mechanically connected to aluminum handle 26, and discharging through a longitudinal hole 27 drilled in the tapered end 28 of handle 26. A slack-sided bladder or accumulator 30 has an outlet 31 which fits snugly over the tapered end 28 of handle 26 and is further sealed by an elastic band 40 which is stretched over the bladder outlet 31 to compress it to the handle 26.

The handle 26 (or valve tip 62) has a tapered end 28 such that a bag connection 31 can be put onto or removed from the handle without any significant loss of refrigerant or entry of air. The connection 31 conforms to the geometry of the tip 28 (or 62) which gradually changes the shape of the bag connection 31 from two sheets of film flat against each other to the condition where the film is wrapped around the handle 26 (or valve tip 62, as the case may be) as the tip 28 (or 62) is pushed into connection 31. Optional groove 26A provides better seal. The low pressure within the bag contributes to the desired conservation of refrigerant vapor.

The accumulator assembly 50 is composed of: the accumulator 30, a protective sleeve 51 which is similar to an envelope open on three sides. The closed side has a handle 52 for easy carrying of the accumulator assembly 50, grommets 53 for easy hanging of the assembly 50, closures 55 to hold the sides of the sleeve 51 around the accumulator 30 and a loop 56 for attaching the seal clip 45 by means of cord 57.

Figure 5A:
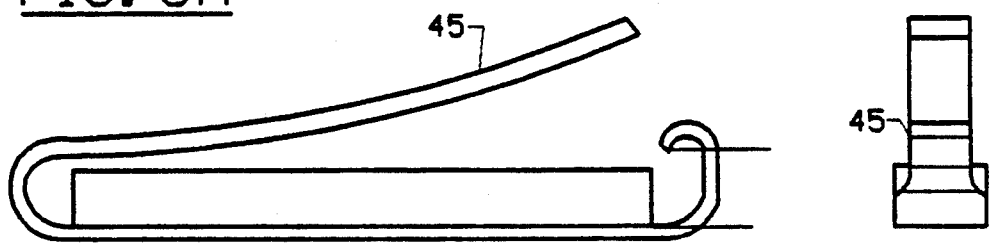
FIGS. 5a and 5b are typical clip for sealing the bag of FIG. 5.

Referring again to FIG. 1, in operation, piercing valves 16 and 17 are placed onto the tubing of refrigeration system 10, a typical home refrigerator. (Only one piercing valve is required, but using one on the high side and one on the low side of the compressor speeds the expelling of refrigerant.) Refrigerant flows through tubes 19 and 19a into the refrigerant service gauge set 18 through hose 20 and optional vacuum pump 21 into valve 25 and through handle 26 into slack-sided accumulator 30. The slack-sided accumulator is flat when the refrigerant begins to flows in, and gradually expands to a plump pillow-like shape containing in the case of a home refrigerator, up to about 1.6 cubic feet of refrigerant vapor (0.5 lbs at 90° F.) or in the case of a typical automotive air conditioner up to about 11.4 cubic feet (3.5 lbs at 90° F.) of refrigerant vapor. When flow stops (as is easily observed by noting that the accumulator is no longer expanding), outlet 31 is removed from the valve 25 by removing the seal band 40 and sliding the accumulator outlet 31 off the valve, closing the opening by flattening the connection as it slides off the tapered end of the valve 25, rolling it up and compressing it with the seal clip 45 shown in FIG. 5a. The accumulator assembly 50 is easily carried or hung in a service truck by means of either the handle 52 or grommets 53 which are an integral part of the sleeve 51.

After the service engineer has completed his workday, acquiring about one or more filled slack-sided accumulators or bags, he simply returns to the home shop and leaves the bags for condensing and purification of the refrigerant to be salvaged.

The refrigeration and recovery system can be completely conventional as shown in the U.S. patents mentioned under background of the invention, or can be of the novel configuration shown in my copending U.S. patent application U.S. Ser. No. 07/371,785.

The bags can be readily reused after the refrigerant has been expelled into the recovery/purification unit. The refrigerant is, of course, recycled for use in conventional refrigeration systems.

Though the above preferred embodiments have been described in a refrigeration system which would commonly use refrigerant 12, the system is also adaptable to recovery of refrigerants 11, 22, 502, 500, 503, 113, 114, and similar halogenated hydrocarbons. Other refrigerants may be recovered with the system, but these are less preferred because of toxic and possible corrosive hazards and because they are less commonly encountered in smaller refrigeration systems.

Bags

The bags for use with the present invention are not narrowly critical. For convenience and economy, they will preferably be made of sheet materials, preferably hot stamped and welded to shape. They may, of course, be of virtually any shape, though the rectangular configuration shown in the figures will be preferred. Tucks or gussets may be added to increase the volumetric capacity of the bag. The bag should be substantially impermeable to the gases they are to hold and to air because cross-contamination is undesirable as is well known in the refrigerant art. The bags can have specially formed fittings attached to their outlets but there is generally no need for this expense and additional weight. Instead, the bag will have a simple extension outlet long enough so that it may be folded over and clipped to seal the bag and also long enough to provide a good seal on the filling and withdraw valves 26 and 60 shown in FIGS. 1, 4 and 5, respectively.

Figure 3:
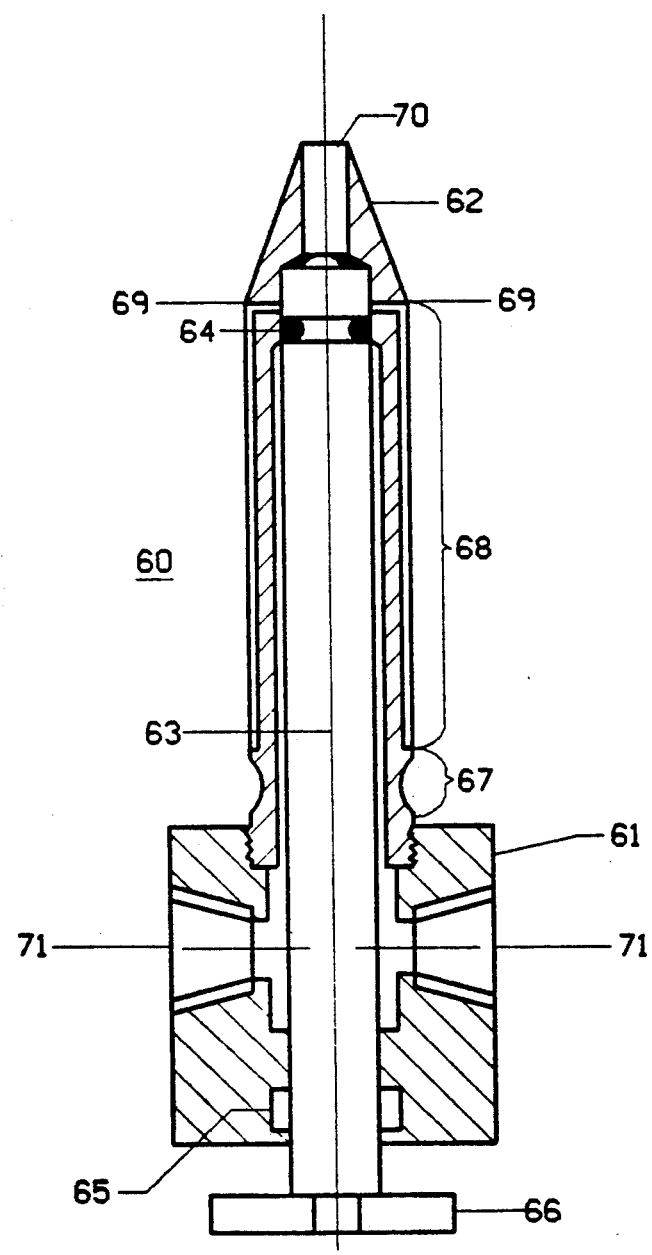
FIG. 3 is a section diagram of a simple valve for withdrawing refrigerant from the bag at the inlet to the refrigerant reclaim system.

Referring to FIG. 3, the manifold valve 60 is composed of body 61, tip 62, valve stem 63, tip seal 64, stem seal 65 and handle 66. The tip is inserted into accumulator 30 connection such that the end of the connection is in the area of the cylindrical portion of the tip 67. Seal band 40 is used to make the seal by compressing the connection against the tip.

The tip is long enough to extend several inches into the interior of the accumulator bag. It has one or more, preferably three or four, exterior grooves running parallel with the long dimension of the tip connected to holes 69 drilled into the central gas conduit ("core"). When vapor is extracted from the accumulator it is possible for the bag to deform covering the central inlet hole 70 making extraction of further vapor impossible. The external grooves 68 and holes 69 provide an alternate path for the vapor to enter the tip 62, thus, until all vapor is extracted, the bag cannot be sucked into the tip openings.

After the accumulator connection 31 is attached to the tip 62, the handle 66 is used to pull the valve stem 63 down unsealing the seal 64 and opening the central core to the pipe connections 71. These connections 71 provide for interconnection of more than one valve 60 and connection to the refrigerant reclaim system.

Figure 4:
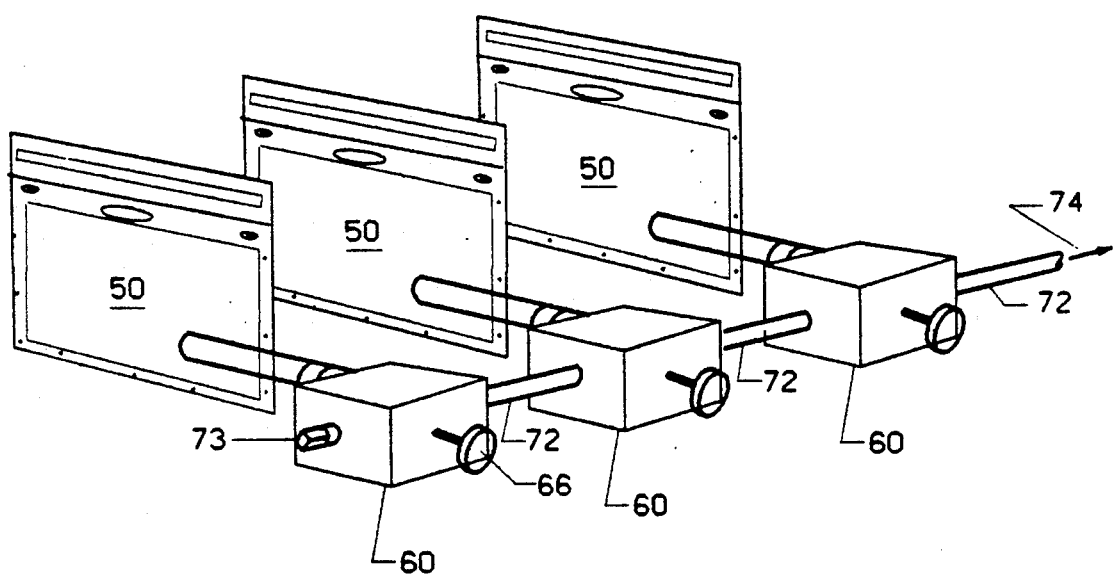
FIG. 4 is a manifold which is connected to the refrigerant recovery/purification system.
Figure 5B:
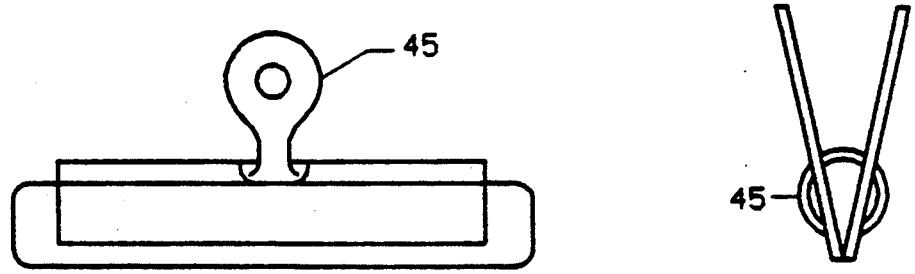

Referring to FIG. 4, valves 60 are arranged such that several accumulator assemblies 50 can be connected to their respective valves 60. Pipe connections 72 and a plug 73 are used to interconnect the valves 60 and seal the blind end and connect to the reclaim system 74.

When the operator desires to recover vapor from a given accumulator 50, he connects the accumulator 50 to the valve 60, then pulls handle 66, connecting the bag to the reclaim machine. One or more valves 60 may be open at one time. When a given bag is empty, its valve may be closed, isolating it from the system. That bag may then be removed and replaced without affecting the other bags that are being emptied into the reclaim system.

While the materials and construction of the bags are not narrowly critical and may be adapted to suit particular needs, particularly preferred bags are constructed from plastic film, more preferably from Mylar brand polyester film manufactured by DuPont, and most preferably from Mylar 50XM860 or Mylar MMC metallized polyester film for excellent gas carrier properties laminated to about 4 mils of polyethylene or similar film such as polypropylene or polyamide (e.g. "nylon") to impart toughness to the structure. Atlanta Film Converting Company produces such film in widths up to 39 inches. Also preferred is the use of silicon coated polyester film as a substitute for Mylar 50XM860 or MMC or the use of metallized polyethylene film producing excellent gas barrier results.

In general, it will be sufficient for the bag to prevent diffusion of substantial amounts of refrigerant gas within the 8-24 hour period in which the bags will commonly be filled before being evacuated by the salvage unit.

Convenient sizes of bags are those holding 8 ounces by weight of refrigerant and those holding about 3-3½ pounds of refrigerant.

Figure 6:
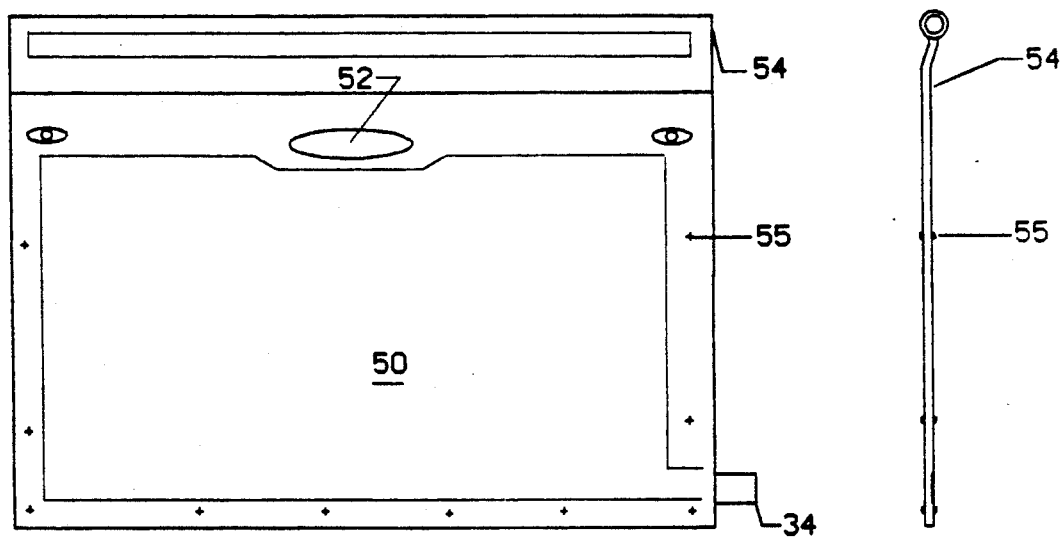
FIG. 6 is a schematic of a preferred flexible bag in a flexible sleeve with carrying handle.

In a particularly preferred embodiment, FIG. 6, the portable bag is inserted into a sleeve 30 which may be rigid or preferably flexible, and may be made of any material suitable for protecting the bag from mechanical damage. These various sleeves may be made from any material having sufficient mechanical properties, but Tyvec brand is particularly preferred because of its toughness, light weight, strength, and low cost. Handles 50, closures 71, e.g. Velcro brand closure materials, zippers or snaps may be used in the design of the sleeve.

Figure 7:
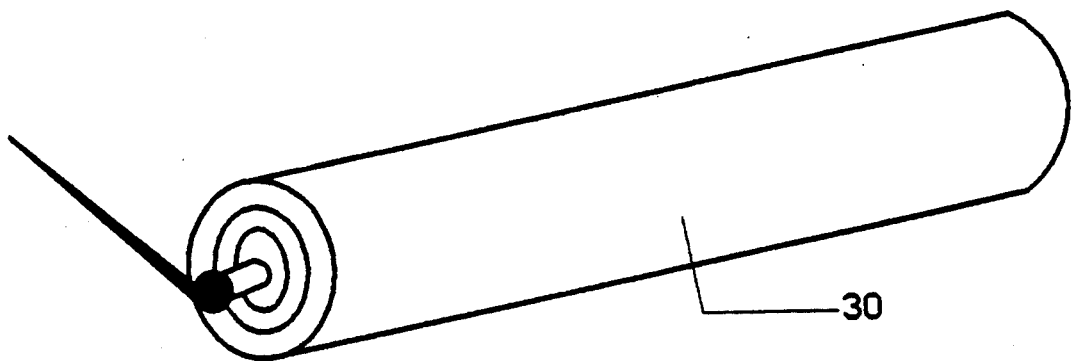
FIG. 7 shows the bag-sleeve assembly of FIG. 6 in a rolled configuration.

In a particularly preferred embodiment, FIG. 7, the sleeve 30 and bag are adapted so that they may be rolled, e.g. by placing a rigid longitudinal stiffener in the sleeve in the sleeve so that the sleeve with the bag inside may be rolled up around the longitudinal stiffener 70. A suitable case for the rolled sleeve-bag assembly can be provided. Rolling saves space and additionally protects from mechanical damage, extending the life of the reusable bags and sleeves.

The exact design of the bag is also not narrowly critical, but the outlet is preferably a snout which is most preferably parallel with the long dimension of the bag so that a larger capacity bag can be fabricated from a given width of film with less waste. The snout is shown as element 40 in FIG. 1, and element 31 in FIG. 2. The snout design has the advantages of eliminating hardware from the bag, simplifying bag manufacture, reducing cost and permitting removal of the valve without substantial loss of refrigerant. The bag can have cemented or heat-sealed seams which may be double seamed. Bags fall safely under extreme conditions by soft failure rather than exploding as do rigid containers.

Figure 8:
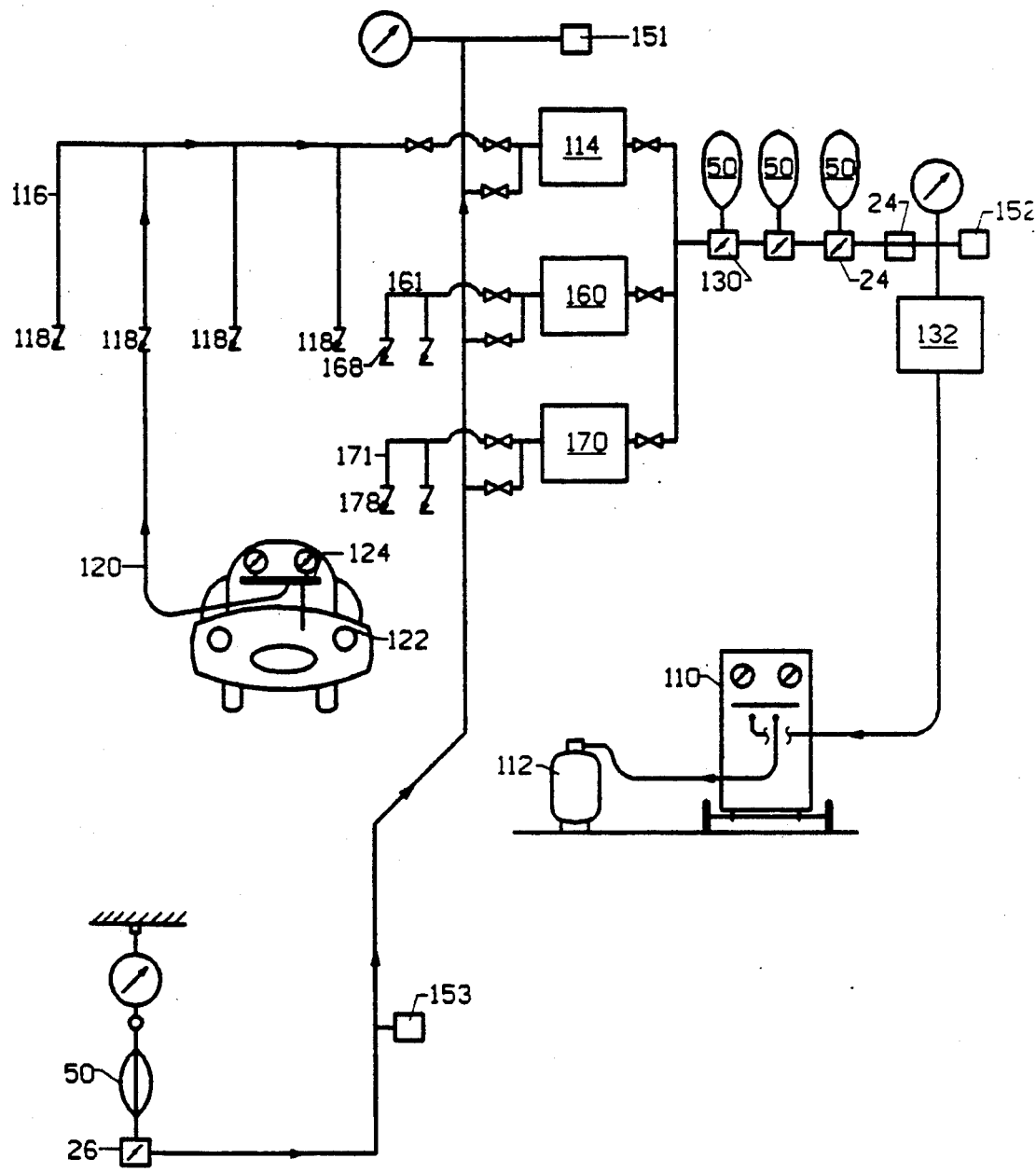
FIG. 8 shows a preferred vacuum pump-compressor-condenser system, said vacuum pump having an inlet manifold and an outlet manifold for accumulator bags.

Preferred shop system having vacuum pump having inlet and outlet manifolds and delivering to compressor-condenser recovery-purification system FIG. 8 shows a particularly preferred system for use in a shop, garage, truck or other refrigerant recovery facility. A conventional refrigerant recovery-purification system mounted on a cart comprising a compressor discharging into a condenser for liquifying refrigerant and filter-dryers or other purification devices for purifying the refrigerant and separating out oil. Examples of such systems are the Ig-Lo/Draf Model 1400, Robinair Model ATC-1000, Murray Model M1100, White Industries Model 01050, and other commerically available refrigerant recovery systems, most of which are conveniently mounted on hand carts, equipped with inlet and outlet pressure gauges, optional refrigerant dryness analyzers, and suitable connection for receiving liquid or vapor refrigerant and for discharging refrigerant. Recovery unit 10 discharges into conventional recovery cylinder 12 from which the refrigerant can be withdrawn to charge or re-charge new or repaired refrigeration systems such as air conditioners, refrigerators, automobile air conditioners, etc.

To efficiently recover the maximum practical amount of refrigerant from each refrigeration system being evacuated, a vacuum pump 114 is located on the suction-side of the compressor in the refrigerant recovery system. The vacuum pump draws through manifold 116 which is equipped with self-closing quick-connect valves 118 which connect through suitable hose connectors 20 to the refrigeration system in an automobile air conditioner through a normal gage-manifold hose system 24 such as typically used by refrigeration service engineers. Several automobiles may be connected to the manifold 116 for evacuation at the same time by vacuum pump 114. The vacuum manifold 16 also includes manifold valve means 24 as shown in more detail in FIG. 4 for receiving bags such as those shown in FIGS. 2, 4 and 6. These bags 50 can be loaded with refrigerant vapor from refrigerators and other difficult-to-move refrigeration systems as described in connection with FIG. 1.

Alternatively, such bags 50 can be connected to the discharge manifold 130 located on the discharge of said vacuum pump.

It has been discovered that by locating said flexible bags on a manifold located between the discharge of the vacuum pump 114 and the intake of the compressor in unit 110, the pressure differential across the vacuum pump can be sharply reduced because the bags maintain the head pressure against which the vacuum pump discharges at substantially atmospheric pressure. Thus at least one of the bags 50 will preferably be connected to manifold 130 at all times.

Though not absolutely necessary, a booster pump such as a diaphragm pump, e.g. the Model DOA-P161-AA S/N 0890 manufactured by Gast Manufacturing Corporation, Benton Harbor, Mich., can be used, changing the diaphragm to neoprene or to Nordel/-Nomex, GAST part number AF-818-A, to resist the refrigeration oil which is a common contaminant of recovered refrigerant. The booster pump will substantially increase the refrigerant reclamation rate. Other types of positive displacement pumps such as gear pumps, peristaltic pumps and the like can be used instead, or the booster pump may be eliminated entirely.

The collection manifold 130 with its bags 50 discharges, either directly or through the optional booster pump 132, into the inlet of the compressor for compressor-condenser refrigeration recovery and purification unit 110. This recovery unit 110 can itself be disconnected from the entire system, e.g. to pump-down a refrigeration system located nearby which cannot be moved into proximity with the vacuum manifold 116.

In short, this preferred system provides means for withdrawing refrigerant from: (a) automotive, truck, and farm equipment air conditioning and cooling systems; (b) stationary refrigeration systems such as refrigerators, etc. by means of bags 50 into which the contents of such systems can be discharged; and (c) conventional pump-down of nearby refrigeration systems which cannot be coupled to the vacuum manifold 116. Further the system provides for nearly maximal recovery of refrigerant because the optional vacuum pump is capable of pulling a substantially deeper vacuum than can normally be obtained with the conventional refrigeration compressor in the recovery system 110.

In operation of the system of FIG. 8, the following steps occur:

(A) Vacuum pump 114 draws a vacuum on the vacuum manifold 116, the system pumps down to the set point of conventional controller switch PSL-1 (151), causing the collection pump to shut off. Three pressure switches, PSL-1, PSL-2, and PSL-3 (shown as 151, 152 and 153, respectively) control pressure on the collection manifold, etc.

(B) When the pressure in the collection manifold 116 rises, e.g., due to connection of an automotive air conditioning system, PSL-1 turns the collection pump on and begins evacuating the entire system, including the connected refrigeration system 122.

(C) The air conditioning technician connects his gauge set 124 (which includes an integral oil separator), to the automotive air conditioning system 122, connects the center gauge hose (with automatic shut off quick disconnect) into the drop hose from vacuum manifold 116 (which may conveniently be installed on the ceiling of the garage), opens the gauge set valve and discharges the automotive air conditioning system in the system of the present invention.

(D) The technician can then leave the system unattended. The refrigerant (generally R-12, though R-22 or R-502 could be recovered with specialized equipment) will be evacuated and the vacuum will be drawn on the automobile air conditioning system automatically. This will generally take from about 5 to about 20 minutes depending on how long it takes to evaporate refrigerant from the air conditioning system. The evacuation is preferably to 1 inch HG vacuum, and more preferably to 5–10 inches HG vacuum.

(E) Oil removed from the car can be measured by draining the oil separator included in the gauge set 124.

(F) The vacuum pump 114 discharges to the atmospheric accumulator 130 which holds the R-12 vapor in bags 50 at approximately atmospheric pressure. (This avoids requiring the vacuum pump to discharge against a pressure head, sharply reducing wear and service problems on the vacuum pump 114.)

(G) The accumulator allows transfer of refrigerant vapor into the system from outside source bags and from multiple automotive A/C system venting at a higher rate than the capacity of the reclaim system. The vapor is held in the accumulator until the reclaim system can process it. Automotive A/C system venting and vapor transfer from bags is not limited by the capacity of the reclaim system.

(H) The booster pump 132 draw refrigerant from the bags 50 and feeds the refrigeration recovery and purification unit 110. When the accumulator bags 50 are empty, PSL-2(152) senses a slight vacuum and shuts off the booster pump 132.

(I) Bags 50 filled from "outside" refrigeration systems (as described above) are hung on a scale and connected to a manifold valve 26.

(J) The manifold valve 26 is opened and the vacuum pump transfers the contents of the bag to the accumulator bags 50 in about one minute.

(K) The manifold valve is then closed and the final bag weight is taken for payment for recovered refrigerant.

(L) In an alternative arrangement, the collection pump 160 can be used to transfer vapor from bags to accumulator.

(M) In another alternative arrangement, the vacuum collection system can be eliminated in favor of the conventional practice of using individual vacuum pumps to draw the hard vacuum on an automotive A/C system ready for final evacuation and charging. A small amount of refrigerant will be lost unless the vacuum pump discharges to the collection manifold.

(N) The outlet of the refrigerant-recovery-purification unit can be automated to transfer reclaimed refrigerant automatically to an outside receiver cylinder protected by an overfill device, e.g. an internal float valve, a spring scale with position sensor, load cell, or other weight or liquid level-sensing system to discontinue filling that container, and, optionally, switch from the full cylinder container to an empty container.

(O) In still further alternate arrangements, the vacuum pump 114 can be installed in parallel with vacuum pump 114. As shown in the drawing, collection pump 160 has a separate manifold 161 with quick connect valves 168 to quick-connect valves 118 on the vacuum manifold. Similarly the transfer pump 170 has a separate manifold 171 which has similar valves 178. The collection pump is a diaphragm pump manufactured by Gast Co. of Benton Harbor, Mich., and draws a vacuum of about 10-15 inches Hg maximum. The transfer pump is a diaphragm pump such as that manufactured by Gast Co. of Benton Harbor, Mich., and can draw a vacuum of about 10 inches Hg. Operation of each of the pumps 114, 160 and 170 can be controlled by a pressure switch shown as 153, or by separate pressure switches (not shown). The advantage of this particular application is that the transfer pump is most efficient for the bag-exhausting phase of removal of refrigerant, the collector pump is more efficient for the initial recovery phase of removal of refrigerant from automobile air conditioners and the vacuum pump is most efficient for pulling a hard vacuum as the last phase of the removal of refrigerant.

Table A recaps the preferred pumps:

TABLE A

| Element | Pump | Approx. Vacuum | Approx. Discharge | Volume | Model/Manufacturer |
| --- | --- | --- | --- | --- | --- |
| 170 | Transfer Pump | 1-10 in. Hg (pref. 1 psig-2 in. Hg) | 0 psig | 1-15 cfm | diaphragm Gast Co., Benton Harbor, MI |
| 132 | Boost Pump | 0 in. Hg | 15-60 psig | 0.5-5 cfm | Gast Co., Benton Harbor, MI |
| 114 | Vacuum Pump | 1-29 in. (pref. 5-20 in. Hg) | 0 psig | 2-10 cfm | Model 93,000 Ritchie Eng., Minneapolis, MN |
| 160 | Collection Pump | 10-15 in. Hg | 0 psig | 1-10 cfm | diaphragm or sliding vane Gast Co., Benton Harbor, MI |

Additional details can be found in my copening application identified above.

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

What is claimed is:

1. A process for the recovery of refrigerant from vehicle refrigeration systems comprising in combination:
   a. connecting one or more of said vehicle refrigeration systems to a multi-inlet evacuation manifold through one or more quick connect values 118;
   b. providing two or more evacuation pumps in parallel;
   c. evacuating said refrigerant from said refrigeration systems through said manifold and at least one of said pumps to a vacuum of at least one inch of mercury;
   d. discharging refrigerant from said pump directly or indirectly into a flexible bag 50, said bag being constructed of a flexible material substantially impermeable to refrigerant and to air, said bag having at least one small orifice for ingress and egress of refrigerant to be salvaged; said bag being simultaneously communicateable with said pump and a compressor;
   e. withdrawing said refrigerant from said bag by connecting said bag directly or indirectly to the suction-side of said compressor.

2. A process according to claim 1 wherein the vacuum drawn on said refrigeration system is about 5 to 10 inches mercury vacuum.

3. A process according to claim 1 wherein said refrigeration system is evacuated through a manifold which permits one or more of said bags to be connected and disconnected without substantial loss of refrigerant to the atmosphere.

4. A process according to claim 1 wherein said pumps are connected to said manifold and two or more refrigeration systems are thereby evacuated at the same time by connecting said systems to said manifold.

5. A process according to claim 1 comprising connecting said refrigeration systems to said manifold through said valved connecting means whereby refrigeration systems are connected and disconnected to said manifold without substantial loss of refrigerant to the atmosphere.

6. A process according to claim 1 wherein said compressor is in a compressor-condenser refrigeration recovery and purification unit and said refrigerant is thereby purified for reuse.

* * * * *